(12) United States Patent
Greer

(10) Patent No.: US 9,293,953 B2
(45) Date of Patent: Mar. 22, 2016

(54) APPARATUS AND METHOD FOR COOLING COMPONENTS FOR ELECTRICAL MACHINES

(75) Inventor: John Michael Greer, Warwickshire (GB)

(73) Assignee: GE Energy Power Conversion Technology, Ltd., Rugby (GB)

( * ) Notice: Subject to any disclaimer, the term of this patent is extended or adjusted under 35 U.S.C. 154(b) by 597 days.

(21) Appl. No.: 13/639,230

(22) PCT Filed: Mar. 24, 2011

(86) PCT No.: PCT/EP2011/001461
§ 371 (c)(1),
(2), (4) Date: Nov. 30, 2012

(87) PCT Pub. No.: WO2011/124328
PCT Pub. Date: Oct. 13, 2011

(65) Prior Publication Data
US 2013/0200734 A1    Aug. 8, 2013

(30) Foreign Application Priority Data

Apr. 6, 2010    (EP) ..................................... 10003692

(51) Int. Cl.
| | |
|---|---|
| *H02K 1/20* | (2006.01) |
| *H02K 9/22* | (2006.01) |
| *B32B 5/02* | (2006.01) |
| *B32B 15/01* | (2006.01) |
| *B32B 15/14* | (2006.01) |
| *H02K 1/02* | (2006.01) |

(52) U.S. Cl.
CPC .. *H02K 1/20* (2013.01); *B32B 5/02* (2013.01); *B32B 15/01* (2013.01); *B32B 15/14* (2013.01); *H02K 1/02* (2013.01); *B32B 2262/103* (2013.01)

(58) Field of Classification Search
CPC ............. H02K 1/20; H02K 1/04; H02K 1/32; H02K 9/005; H02K 9/22; H02K 15/02; H02K 15/022; H02K 15/024; H02K 15/026; H02K 15/028; H02K 15/03
USPC .......................... 310/59, 58, 64, 65, 216.015, 310/216.016–216.019, 216.059; 29/596, 29/598
See application file for complete search history.

(56) References Cited

U.S. PATENT DOCUMENTS

| | | | | |
|---|---|---|---|---|
| 4,103,195 | A | * | 7/1978 | Torossian et al. ...... 310/216.065 |
| 4,542,313 | A | * | 9/1985 | Di Pietro ........................ 310/65 |

(Continued)

FOREIGN PATENT DOCUMENTS

| | | |
|---|---|---|
| CN | 1057552 A | 1/1992 |
| CN | 1852001 A | 10/2006 |

(Continued)

OTHER PUBLICATIONS

Machine translation of FR 2738625 A3 (Mar. 1997).*

(Continued)

*Primary Examiner* — Michael Andrews
(74) *Attorney, Agent, or Firm* — Parks Wood LLC

(57) ABSTRACT

The invention relates to a component such as a rotor or stator for an electrical machine. The component includes a plurality of axially adjacent stacks of laminations. At least one pair of adjacent stacks are spaced apart in the axial direction by spacer means such that a passageway or duct for cooling fluid, e.g. air, is formed therebetween. The spacer means comprises a porous structural mat of metal fibers. The cooling fluid may flow through the spaces or voids between the fibers.

5 Claims, 1 Drawing Sheet

(56) References Cited

U.S. PATENT DOCUMENTS

| | | |
|---|---|---|
| 5,091,666 A | 2/1992 | Jarczynski |
| 8,174,156 B2 | 5/2012 | Nakahara et al. |
| 2003/0071525 A1* | 4/2003 | Tong et al. ................ 310/65 |
| 2003/0077476 A1 | 4/2003 | Reutlinger |
| 2003/0082335 A1 | 5/2003 | Clyne et al. |
| 2004/0245883 A1 | 12/2004 | Mitcham et al. |

FOREIGN PATENT DOCUMENTS

| | | | |
|---|---|---|---|
| CN | 101588092 A | 11/2009 | |
| EP | 0 144 693 A2 | 6/1985 | |
| EP | 2 112 742 A2 | 10/2009 | |
| FR | 2 738 625 A3 | 3/1997 | |
| FR | 2738625 A3 * | 3/1997 | ........ F28F 1/12 |
| GB | 1 159 460 A | 7/1969 | |
| GB | 2 435 918 A | 9/2007 | |
| JP | 2001157396 A | 6/2001 | |

OTHER PUBLICATIONS

Unofficial English translation of Office Action issued in connection with corresponding CN Application No. 201180027849.2 on Aug. 12, 2014.

* cited by examiner

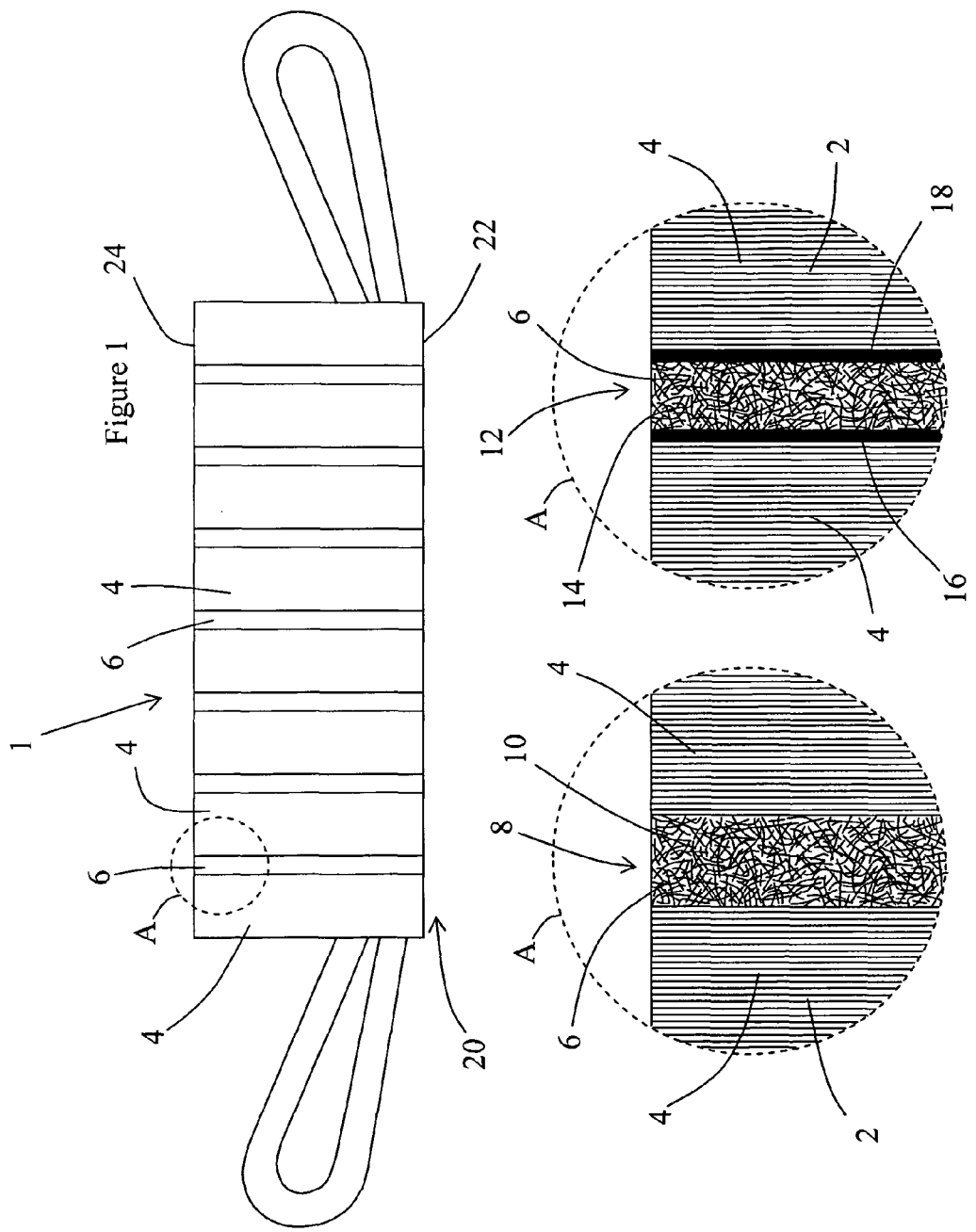

APPARATUS AND METHOD FOR COOLING COMPONENTS FOR ELECTRICAL MACHINES

FIELD OF THE INVENTION

The present invention relates to electrical machines (e.g. motors and generators), and in particular to electrical machines that have cooling passageways or ducts.

BACKGROUND OF THE INVENTION

It is known to produce laminated components for electrical machines by pressing stacks of annular laminations together. The laminations are typically formed from sheets of electrical grade steel which are usually provided with insulating coatings. Each annular lamination may be formed of a single member or may itself be of segmental construction with the segments abutted against each other e.g. at generally radially extending edges.

In a normal arrangement the laminations are provided in axial sections with a plurality of stacked laminations in each section. Between each section, passageways or ducts may be provided for cooling fluid, e.g. air, which extend generally radially. More particularly, in an electrical machine having a rotor and a stator the radial inner or outer ends of the passageways will communicate with the air gap between the rotor and stator.

It is known to form these passageways by utilising spacers such as beams or cylindrical members, the latter type commonly being referred to as pins. Such spacers are affixed mechanically or by welding, e.g. spot welding, to the face of an end lamination of one section. The spacers then abut the face of the adjacent end lamination of the neighbouring section to define a passageway therebetween. The production and attachment of such spacers is a complex and expensive undertaking, even where a single common mass produced part such as pins is used. A passageway that is defined by a plurality of pins arranged in a predetermined pattern offers certain advantages in terms of cooling efficiency but still requires large air flow rates to cool the laminated component.

SUMMARY OF THE INVENTION

The present invention provides a component for an electrical machine comprising a plurality of axially adjacent stacks of laminations, wherein at least one pair of adjacent stacks is spaced apart by spacer means, the spacer means typically being arranged between confronting laminations of the adjacent stacks, such that a passageway for cooling fluid is formed between the at least one pair of adjacent stacks, the spacer means comprising a porous structural mat of metal fibres.

The spacer means is preferably in abutment with confronting laminations of the adjacent stacks.

In a particular arrangement, the spacer means may further comprise at least one metal face plate that is joined to the fibrous mat to form a sheet material. A pair of metal face plates may be joined to opposite surfaces of the fibrous mat such that the fibrous mat is sandwiched between them to form a core of the sheet material. The metal face plates may be made from a variety of different metals such as stainless steel, steel, aluminium and titanium. The thickness of the metal face plates may be selected depending on the particular requirements.

The fibrous mat is formed from a porous network of fibres as described generally in US 2003/0082335 to Cambridge University Technical Services Ltd. The fibres may be randomly or regularly arranged. If the fibres are regularly (or non-randomly) oriented then the properties of the fibrous mat (e.g. its thermal or electrical conductivity) can be selected to be anisotropic. The structural integrity of the fibrous mat results from the way in which the fibres are solidly joined to neighbouring fibres and, in the case of a sheet material, to the metal face plate(s). The fibres may be joined by any suitable technique such as bonding (e.g. with an adhesive), brazing or sintering, for example. The fibrous mat may be pre-formed and then joined to the metal face plate(s) to form the sheet material.

The fibres can be made from stainless steel or other metals such as steel, aluminium and titanium. A particularly suitable material for the fibres is considered to be austenitic stainless steel grade 316 L. The average length and diameter of the fibres can be selected depending on the particular requirements.

The fibrous mat preferably has a relatively open structure such that cooling fluid can flow freely through the spaces between the fibres. The percentage of volume occupied by the fibres and the thickness of the fibrous mat can be selected depending on the particular requirements.

The fibrous mat has a high compressive strength, which is improved by the addition of the metal face plate(s). The fibrous mat also has very high heat transfer capabilities because of its large surface area and a high heat transfer coefficient because the porous network of fibres restricts the formation of thermal boundary layers as the cooling fluid flows through the spaces between the fibres. An improved thermal performance allows for reduced cooling fluid flow rates through the component.

The improved thermal performance means that the spacer means of the present invention can be made thinner than conventional spacer means such as pins while providing comparative levels of cooling. This means that the physical size of the component can be reduced, leading to corresponding reductions in both mass and cost. Further cost savings are possible because of the ease of manufacturing production times are considerably reduced because there is no need to spot weld the spacer means to the face of an end lamination.

The spacer means can be formed by any suitable method, e.g. laser cut or the like or punched from a pre-formed fibrous mat or pre-formed sheet material.

Once the spacer means have been formed then they are positioned within the component, typically between each pair of axially adjacent stacks of laminations to form a plurality of axially spaced passageways for cooling fluid. The spacer means are normally held under a compressive load within the component which acts to consolidate the spacer means and the lamination stacks into a core.

In some arrangements the spacer means can comprise an axial stack of fibrous mats, some of which can be optionally joined to at least one metal face plate, i.e. the axial stack may include a combination of fibrous mat and sheet material layers depending on the particular requirements. This allows for wider passageways to be provided between the adjacent stacks without having to increase the thickness of the fibrous mat or sheet material.

The spacer means may be fixed to the confronting laminations of the adjacent stacks or simply held in position within the component by an applied compressive load.

The spacer means may be shaped and sized to fill the whole of the passageway between the at least one pair of adjacent stacks or just a part of it. The spacer means will preferably be substantially evenly distributed within the passageway and must be capable of withstanding any applied compressive load. If the passageway includes gaps where there is no fibrous mat or sheet material then cooling fluid can flow through these gaps as well as through the spacer means. Alternatively, any gaps between the spacer means can be filled such that the cooling fluid is allowed to flow only through the spacer means.

The spacer means and/or the gaps between the spacer means may be arranged within the passageway in a predetermined pattern to achieve a predetermined cooling effect.

Suitable fibrous mat and sheet material is commercially available from Fibre Technology Ltd of Brookhill Road, Pinxton, Nottinghamshire, NG16 6NT, United Kingdom under the trade names FIBRESHEET and FIBRECORE, respectively. Although the fibrous mat and sheet material are already known, they are intended for use in construction (e.g. the manufacture of aircraft or vehicle parts) with particular emphasis being placed on their mechanical properties of low mass and high strength and rigidity. The porous open structure of the fibrous mat has not previously been exploited for the passage of cooling fluid.

The component can be a rotor or stator for an electrical machine, for example.

The present invention further provides a method of cooling a component for an electrical machine comprising a plurality of axially adjacent stacks of laminations, wherein at least one pair of adjacent stacks are spaced apart by spacer means such that a passageway for cooling fluid is formed between the at least one pair of adjacent stacks, the spacer means comprising a porous structural mat of metal fibres, the method comprising passing a cooling fluid through the space between the metal fibres of the mat to cool the adjacent stacks.

BRIEF DESCRIPTION OF THE DRAWINGS

Exemplary embodiments of the invention will now be described, with reference to the accompanying drawings, in which:

FIG. 1 is a cross section through a stator core of a rotating electrical machine having spacer means according to the present invention defining a passageway for cooling air;

FIG. 2 is a detail view of the stator core of FIG. 1 with a first type of spacer means; and FIG. 3 is a detail view of the stator core of FIG. 1 with a second type of spacer means.

DETAILED DESCRIPTION OF THE PREFERRED EMBODIMENTS

The stator core 1 of a rotating electrical machine is built up from a plurality of annular laminations 2 typically formed from sheets of electrical grade steel which are usually provided with insulating coatings.

The laminations are provided in axial sections 4 with a plurality of stacked laminations 2 in each section. The lamination sections 4 are axially spaced apart by spacer means 6.

In FIG. 2 the spacer means consist of a single layer of FIBRESHEET material in the form of a fibrous mat 8 with a porous network of stainless steel fibres 10.

In FIG. 3 the spacer means consist of a single layer of FIBRECORE material in the form of a fibrous mat 12 with a porous network of stainless steel fibres 14 that is sandwiched between, and joined to, a pair of stainless steel face plates 16, 18 that provide additional strength and rigidity.

The spacer means 6 define a series of axially spaced cooling passageways or ducts for cooling air. The cooling air flows through the spaces or voids between the fibres 10, 14 of the FIBRESHEET and FIBRECORE material to cool the adjacent lamination stacks 4. In the case of the stator core 1 shown in FIG. 1, the passageways terminate at their radial inner end at an air gap 20 between the inner surface 22 of the stator core and the outer surface of a rotor (not shown). Cooling air flows from the air gap through the cooling passageways or ducts towards the outer surface 24 of the stator core 1.

Similar cooling passageways or ducts can be formed between axial sections of annular laminations forming a rotor core.

What is claimed:

1. A component for an electrical machine comprising:
   a first plurality of lamination stacks, each being positioned adjacent another stack in the first plurality;
   a second plurality of lamination stacks, (i) each being positioned adjacent another stack in the second plurality and (ii) positioned adjacent the first plurality forming a passageway there between; and
   a porous spacer (i) positioned in only a portion of the passageway between the first and second pluralities of laminations forming one or more gaps in the passageway and (ii) formed of metal fibers,
   wherein a relationship between a percentage of volume occupied by the metal fibers and a thickness of the spacer is arranged to facilitate a flow of liquid through the one or more gaps and the spacer.

2. The component of claim 1, wherein the spacer is connectable a metal face plate such that the compression strength of the spacer is enhanced.

3. The component of claim 1, wherein the spacer is connectable a first metal face plate on a first surface and connectable to a second metal face plate on a second surface, opposite the first surface, such that the compression strength of the spacer is enhanced.

4. The component of claim 1, being a rotor or stator for an electrical machine.

5. A method of cooling a component for an electrical machine comprising:
   positioning a first plurality of lamination stacks adjacent a second plurality of lamination stacks, wherein each stack of the first plurality is positioned adjacent another stack in the first plurality and each stack of the second plurality is positioned adjacent another stack in the second plurality, forming a passageway there between; and
   positioning a porous spacer in only a portion of the passageway between the first and second pluralities of laminations forming one or more gaps in the passageway, the spacer being formed of metal fibers, wherein a relationship between a percentage of volume occupied by the metal fibers and a thickness of the spacer is arranged to facilitate a flow of liquid through the one or more gaps and the spacer.

* * * * *